G. Thackray,
Steam Slide Valve.
Nº 50,750.            Patented Oct. 31, 1865.
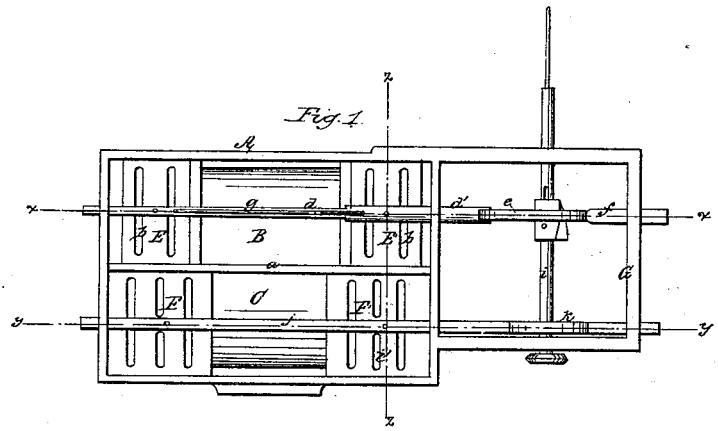
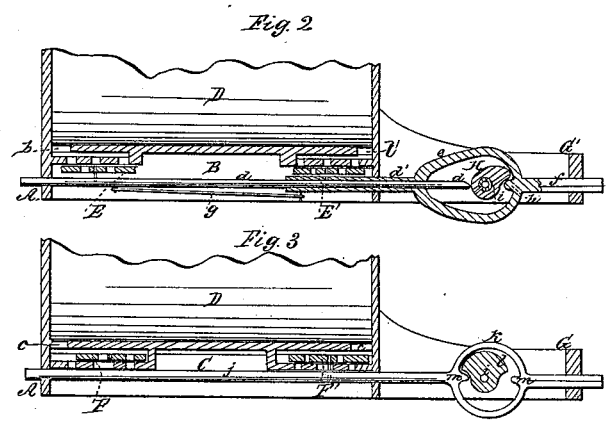
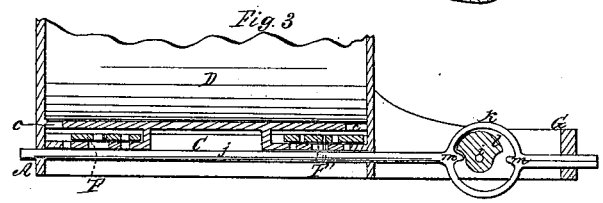
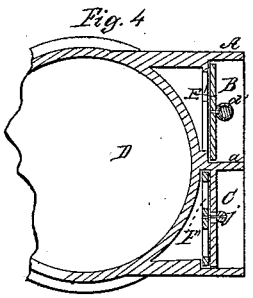
Witnesses;
M. M. Livingston
W. Hauff
Inventor;
George Thackray

UNITED STATES PATENT OFFICE.

GEORGE THACKRAY, OF MYSTIC BRIDGE, CONNECTICUT.

IMPROVEMENT IN SLIDE-VALVES FOR STEAM-ENGINES.

Specification forming part of Letters Patent No. 50,750, dated October 31, 1865.

*To all whom it may concern:*

Be it known that I, GEORGE THACKRAY, of Mystic Bridge, in the county of New London, and State of Connecticut, have invented a new and Improved Steam-Valve; and I do hereby declare that the following is a full, clear, and exact description thereof, which will enable others skilled in the art to make and use the same, reference being had to the accompanying drawings, forming part of this specification, in which—

Figure 1 represents a front elevation of the valve-chest and valves, the top of the valve-chest having been removed to expose the interior of the same. Fig. 2 is a horizontal section of the same, the plane of section being indicated by the line $x\,x$, Fig. 1. Fig. 3 is a similar section of the same, taken in the plane indicated by the line $y\,y$, Fig. 1. Fig. 4 is a transverse vertical section of the same, the line $z\,z$, Fig. 1, indicating the plane of section.

Similar letters of reference indicate like parts.

This invention relates to a steam-valve which is divided in four distinct parts, two of which are intended to control the supply of steam to the cylinder and to the exhaust, the valve-chest being divided in two distinct compartments, one of which contains the supply and the other the exhaust-valves. The supply-valves are secured each to a distinct and separate valve-stem, one of which is hollow and bored out to admit the end of the other stem. The two stems are connected by a spring, and the hollow stem is made with a large loop, through which passes a revolving shaft carrying a cam, which acts alternately on the end of the solid stem and then on a projection on the inside of the loop of the hollow stem in such a manner that by the combined action of the cam and of the spring which connects the two stems the two supply-valves are alternately opened and then suddenly closed so as to cut off the steam at the desired point. By making the cam movable on the revolving shaft and connecting it to the governor the cut-off is rendered self-adjusting. The two exhaust-valves are connected to a common stem, which is also provided with a loop to straddle a cam mounted on the revolving shaft in such a manner that by the action of said cam and loop the valves are held firmly in the desired position and suddenly opened and closed at the desired intervals.

A represents the valve-chest, which is divided by a longitudinal partition, $a$, in two compartments, B C, each of which communicates by two ports, $b\,b'\,c\,c'$, with the interior of the steam-cylinder D. The compartment B contains the supply-valves E E', which open and close the steam-ports $b\,b'$, and the compartment C contains the exhaust-valves F F', which are intended to open and close the exhaust-ports $c\,c'$. The valve E' is secured to a hollow stem, $d'$, which extends through the end of the valve-chest, where it joins a loop, $e$, through which said hollow stem connects with the solid guide-piece $f$, that has its bearing in a yoke, G, secured to the end of the valve-chest, and which may be made square or polygonal to prevent the hollow stem from turning round spontaneously. Through the hollow stem $d'$ of the valve E' extends the solid stem $d$ of the valve E, and a spring, $g$, of india-rubber or any other suitable material, connects the two stems $d\,d'$, and serves to keep the points of the solid stem $d$ and a projection, $h$, on the inside of the loop, $e$, in contact with the opposite sides of a cam, H. (See Fig. 2.) This cam is mounted on a shaft, $i$, to which a revolving motion is imparted from some portion of the engine, and the shape of said cam is such that by its action the valves E E' are alternately opened and then allowed to close suddenly by the action of the spring $g$. The shaft $i$ has its bearings in the yoke G, and the cam H is adjustable, and it is so formed that by shifting it on the shaft in a longitudinal direction the time when the steam is cut off is varied. By connecting the cam to a governor the cut-off is rendered self-adjusting.

In order to increase the surface of the valve-opening, the valves, as well as their seats, may be made in the form of grates, as shown in the drawings.

The exhaust-valves F F', which work on suitable seats in the compartment C of the valve-chest, are connected to a common solid valve-stem, $j$, which extends through the end of the valve-chest and through the yoke G, as shown in Figs. 1 and 3 of the drawings. A portion of this stem forms a loop, $k$, which straddles a cam, $l$, mounted on the revolving-shaft $i$.

This cam acts on projections $m$, which rise from the inner surface of the loop $k$, as shown particularly in Fig. 3 of the drawings. As the cam $l$ revolves with the shaft $i$ it alternately comes in contact with one and then with the other of the projections $m$, and thereby the stem $j$, with the valves F F′, receive an intermittent reciprocating motion, causing the exhaust-ports to open and to close at the proper intervals.

By the use of separate valves for opening and closing the steam and the exhaust ports the time when the several ports are opened and closed can be nicely adjusted, and the proper lap and lead can be given to each valve, and by combining with the steam-supply valves the adjustable cam H and with the exhaust-valve the cam $l$ the operation of the several valves is rendered easy and sure.

I claim as new and desire to secure by Letters Patent—

1. The adjustable cam H, applied in combination with the valves E E′, solid stem $d$, and hollow stem $d'$ with loop $e$, substantially as and for the purposes set forth.

2. The combination of two skeleton steam-valves moved independently and two skeleton exhaust-valves moved simultaneously, substantially as and for the purposes herein set forth.

GEORGE THACKRAY.

Witnesses:
 M. M. LIVINGSTON,
 W. HAUFF.